United States Patent [19]

Dull

[11] Patent Number: 5,676,991
[45] Date of Patent: Oct. 14, 1997

[54] METHOD FOR REMOVAL OF CAPSAICINOIDS FROM PEPPERS

[75] Inventor: Bob J. Dull, O'Fallon, Ill.

[73] Assignee: The Pillsbury Company, Minneapolis, Minn.

[21] Appl. No.: 421,395

[22] Filed: Apr. 13, 1995

[51] Int. Cl.⁶ .................................................. A23L 1/211
[52] U.S. Cl. .................... 426/429; 426/425; 426/438; 426/534; 426/615; 426/650
[58] Field of Search .................... 426/615, 639, 426/651, 429, 650, 534, 425, 438

[56] References Cited

U.S. PATENT DOCUMENTS

| 4,681,769 | 7/1987 | Bennett et al. | 426/429 |
| 5,120,558 | 6/1992 | Nguyen et al. | 426/425 |

FOREIGN PATENT DOCUMENTS 6083895   3/1987   Japan.

OTHER PUBLICATIONS

Patents Relating To The Extraction Of Capsaicin From Jalapeno And Other Peppers; Computer database search dated Feb. 3, 1995.
Capsaicin Patents; Computer database search dated Feb. 6, 1995.
Dialog Computer database search dated Feb. 9, 1995.
Pillsbury Literature Search entitled: Patents On Reduction Of Capsaicin Heat; dated Feb. 23, 1995.

*Primary Examiner*—Donald E. Czaja
*Assistant Examiner*—Lien Tran
*Attorney, Agent, or Firm*—Haverstock, Garrett & Roberts

[57] ABSTRACT

A method is described for removing capsaicinoids from a pepper whereby the pepper's placental membrane is exposed to an oil. Preferably, the pepper or peppers will be cut in sizes ranging from minced to longitudinal cuts to expose and rupture the placental membrane, allowing an oil to contact and solubilize the capsaicinoids. In the preferred embodiment, the peppers are minced and placed in a heated edible oil. The edible oil pepper mixture is then agitated at a mixing speed tip velocity of between about 30 feet/minute and about 270 feet/minute. The peppers are then removed from the edible oil and rinsed to remove excess edible oil from the peppers. The method permits extraction of the capsaicinoids, while maintaining the peppers' natural flavor, texture, and color. The edible oil will include oils where the acyl groups are saturated fatty acids, unsaturated fatty acids, or a combination of saturated fatty acids and unsaturated fatty acids, with the most preferred edible oil being a vegetable oil.

26 Claims, 2 Drawing Sheets

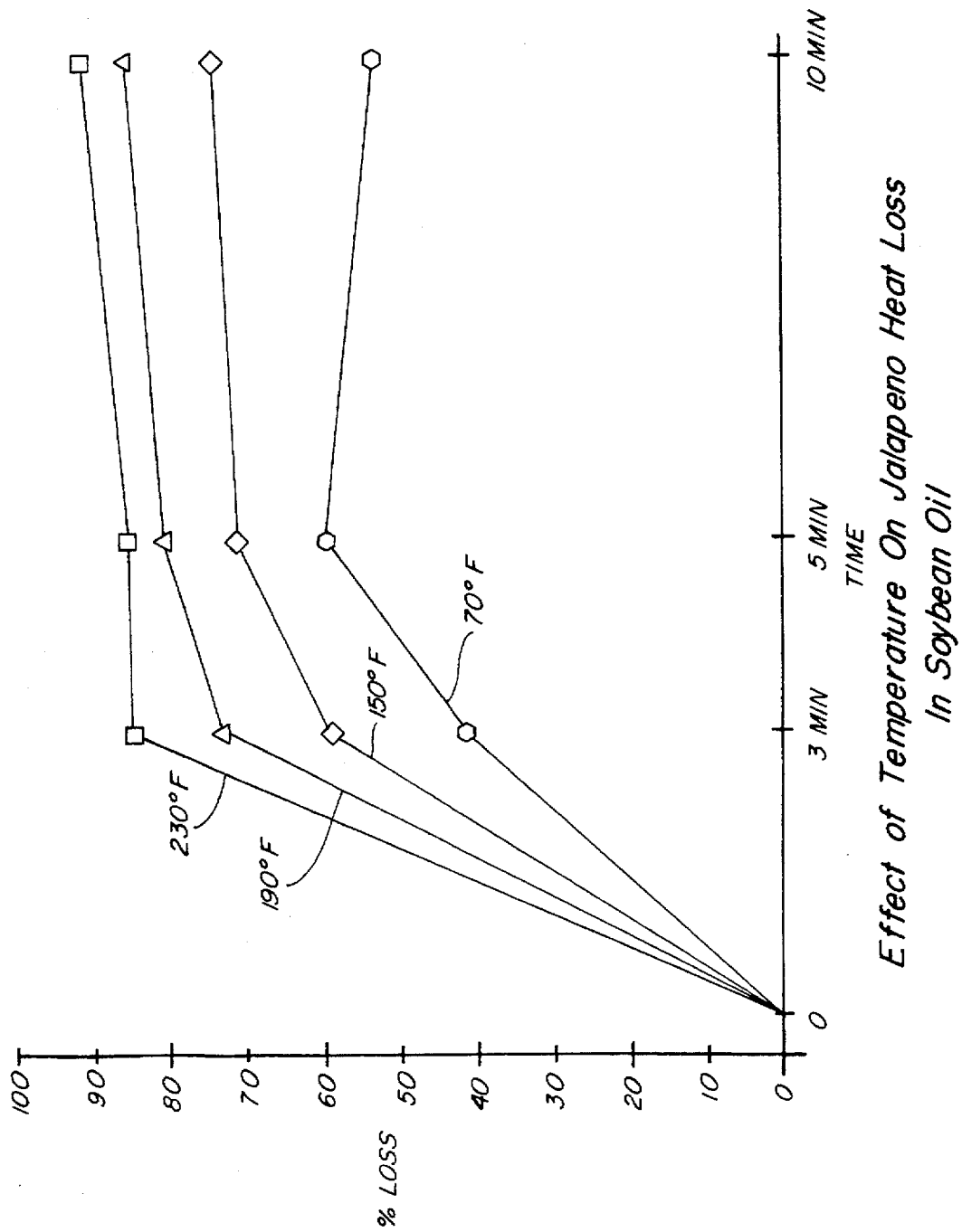

METHOD FOR REMOVAL OF CAPSAICINOIDS FROM PEPPERS

BACKGROUND OF THE INVENTION

The present invention relates to a method for removing capsaicinoids from peppers using oil. More specifically, the present invention uses an edible oil for the removal of the capsaicinoids from the fruit of the pepper and therefore the pepper's hotness, while retaining the pepper's natural color, texture, and flavor.

Capsalcinoids are chemical compounds that produce a heat sensation when the pepper is eaten, and are located in the pepper's placental membrane. As a general rule, the greater the amount of capsaicinoids the higher the heat level in the pepper.

Peppers containing capsaicinoids are commonly used in salsas, dips, refried beans, and a variety of other Mexican style food products as well as other types of food products. To provide consistent hotness in these food products, the hotness of the peppers must be controlled. But, the amount of capsaicinoids in the peppers varies considerably from plant to plant and from one pepper field to another. Growing conditions, varietal types, soil types, weather, and other factors influence the biochemical conditions in the cells of the peppers that cause the amount of the capsaicinoids in individual peppers to vary. As a result of the varied capsaicinoid levels, the peppers must be tested before placement into food products otherwise the food products will have inconsistent levels of hotness. Unfortunately, testing the capsaicinoid levels before entry into the food production process is time consuming, expensive, and is not entirely accurate. Additionally, each individual pepper cannot be tested, leaving the danger that a consumer could bite into a pepper that is too hot. While food makers have programs and systems for monitoring the peppers to ensure uniform capsaicinoid levels, it is impossible to ensure that each pepper will contain the same amount of the capsaicinoids. Consequently, despite efforts to monitor the consistency of the peppers before they enter the production process, problems with inconsistent food products still result because of a lack of uniform capsaicinoid levels in the peppers. Thus, the known methods of ensuring uniform capsaicinoids levels are inadequate. By way of example, a mild salsa may contain peppers that were not correctly identified causing the mild salsa to be hotter than expected.

Previous methods for controlling hotness in the peppers, as mentioned, have included identifying and separating the peppers according to their capsaicinoid levels. Other previous methods have used compounds such as alcohol derivatives to solubilize and reduce the capsaicinoids. Also, still other previous methods have included genetically manipulating the pepper plants to control the capsaicinoid levels naturally. These methods, however, are ineffective as alcohol derivatives can be harmful to humans and they strip the peppers of water, resulting in the peppers losing their taste. Further, genetically manipulating the plants is not always effective as uniform results are difficult to obtain. Thus, the prior methods suffer from a number of problems including expense, accuracy, and harmfulness to humans.

SUMMARY OF THE INVENTION

In accordance with the present invention, the capsaicinoids from a variety of different types of peppers are removed from such peppers. Using the present method all or part of the capsaicinoids are effectively removed to negligible or predetermined levels, while allowing the peppers to maintain their natural color, texture, and flavor.

Preferably, the capsaicinoids are reduced to negligible levels as reduction to negligible levels is less expensive and time consuming. Reducing the capsaicinoids in the peppers to predetermined levels is more expensive as the capsaicinoid levels must be measured before treatment, thus involving more steps and more cost. Therefore, it is preferred to reduce the capsaicinoids to negligible levels, but it is recognized that the present method may be used to remove a specific amount of the capsaicinoids instead of reducing the capsaicinoids to negligible levels.

By reducing the capsaicinoids in the peppers to negligible levels, consumers will be unable to detect differences in food products containing the peppers. Thus, uniform hotness in the food product is ensured. Further, once the capsaicinoids are extracted they can be added back to the food product at a later time, as desired, to raise the heat levels in a controlled manner within the food product. The final result is a more uniform product having heat levels that remain consistent, thereby ensuring consistent taste and hotness throughout the product.

The present method is advantageous as it uses an extraction oil, preferably an edible oil, to remove the capsaicinoids from the pepper's placental membrane. The use of an edible oil is preferred in the present method as the edible oil solubilizes the capsaicinoids, while leaving the natural qualities of flavor, texture, and color in the pepper or peppers. It is important that not only are the capsaicinoids removed, but that the natural qualities of the pepper remain. By leaving the natural qualities, the consumer receives a pepper that appears to be completely natural, but the pepper is no longer hot. Furthermore, once the pepper has been treated the capsaicinoids may be removed from the oil.

According to the preferred method, the peppers are cut, so as to expose the pepper's placental membrane, into a desirable size dependent, in part, upon how the peppers are to be used in the food product. Once the peppers have been cut, they are placed in a heated edible oil for a suitable period of time. While in the edible oil the peppers are agitated. The length of time the peppers are in the edible oil is dependent upon how much of the capsaicinoids are to be removed from the peppers. Removal of the capsaicinoids is, also, dependent upon the temperature of the edible oil and the intensity of the agitation. After removal from the edible oil the peppers are rinsed to remove the excess oil. The peppers are then placed in any food product that previously could have contained the peppers before treatment by the present method. Thus, the treatment results in a group of peppers having relatively uniform heat levels while maintaining their natural flavor, texture, and color.

BRIEF DESCRIPTION OF THE DRAWINGS

FIG. 2 is a graph showing the percentage of the capsaicinoids removed from the peppers based on the time in the oil and the temperature of the oil.

DESCRIPTION OF THE PREFERRED EMBODIMENTS

Figure 1:
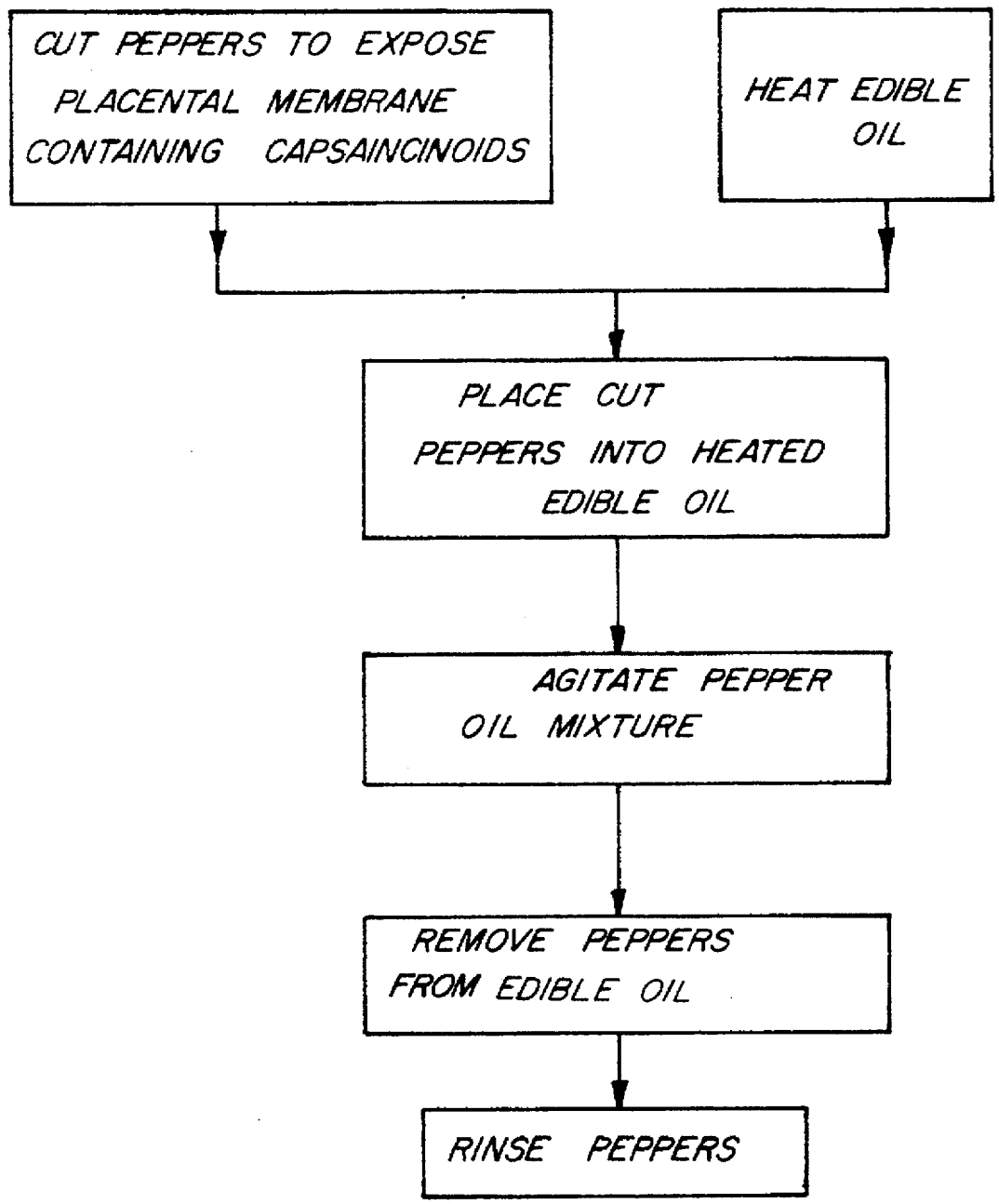
FIG. 1 is a schematic flow diagram of the preferred method for removing the capsaicinoids from peppers according to the present invention.

In accordance with the present invention a method is provided for removing capsaicinoids from a pepper or peppers while allowing the peppers to maintain desirable natural qualities pertaining to texture, color, and taste. Referring to FIG. 1, the preferred method, but not the only method, for removing the capsaicinoids, is to cut the peppers; place the cut peppers into a heated edible oil; agitate the pepper oil mixture; remove the peppers from the edible oil; and rinse the peppers to remove any clinging oil residue. No further steps are necessary to ready the peppers for use in commercial food products.

The peppers are initially cut to expose and rupture the placental membrane or membranes located inside each of the peppers. The placental membrane is in the interior portion of the peppers and is not exposed to the outside environment. Therefore, cutting the peppers serves two purposes. First, by cutting the peppers, the individual placental membranes are exposed to an oil. Second, the rupturing of each of the placental membranes facilitates easier removal of the capsaicinoids by allowing an oil to contact and solubilize the capsaicinoids. Thus, the peppers' placental membrane must be treated in some way to expose it to an oil and to allow the oil to contact and solubilize the capsaicinoids. The pepper or peppers may be cut into a variety of sizes ranging from minced to pieces a quarter inch square, or larger. Furthermore, it is permissible to cut the peppers into longitudinal sections. But, the more thoroughly the peppers are cut the easier it is to remove the capsaicinoids. This is because the placental membrane in each of the peppers is more thoroughly ruptured thereby allowing a greater amount of the capsaicinoids to exit the placental membrane. Thus, it is preferable to mince the peppers or cut the peppers into small pieces. Of course the peppers may be cut to any size to satisfy a desired end use.

A number of means may be used to cut the peppers, including a knife, a Urschell dicer, or any other type of equipment capable of cutting the peppers. The type of equipment used for cutting the peppers will be dependent upon the size of the food processing operation and the end use of the peppers.

Typically, the cut peppers may be any type of pepper containing the capsaicinoids. The following group is illustrative of, but not limited to, the peppers that may be used in the present method, included are: cayenne peppers, jalapeno peppers, serrano peppers, poblano peppers, green chili peppers, yellow hot peppers, habenero peppers, and any other type of pepper so long as such peppers contain the capsaicinoids. The present method is particularly advantageous as it can be used on jalapeno peppers, which are frequently used in commercial food products.

Once the peppers have been cut they are placed into an oil, preferably a heated extraction oil. The peppers may be placed into the heated oil chilled or at room temperature, however, it is preferred to place the peppers into the oil when they are at room temperature as this has been found to lessen the extraction time of the capsaicinoids. Chilled peppers significantly lower the temperature of the heated oil causing a longer period of time for removal of the capsaicinoids.

The temperature of the oil may be from about 50° F. to about 250° F., however, it is preferable to have the temperature of the oil range from about 120° F to about 200° F. The most desirable removal of the capsaicinoids has been found to occur at about 180° F. Generally, the temperature of the oil must not be too low or the capsaicinoids' removal will take too long. Conversely, the temperature cannot be too high as the water will be boiled out of the peppers damaging the peppers' natural characteristics. It should be noted that the temperature of the oil will be in part controlled by the atmospheric pressure as the lesser the pressure the lower the boiling point. But, the oil may be at any temperature as long as the capsaicinoids are adequately removed and the peppers' natural characteristics are not damaged.

The capsaicinoids may be comprised of some or all of seven specific compounds, which are capsaicin, dihydrocapsaicin, nordihydrocapsaicin, homocapsaicin, homodihydrocapsaicin, norcapsaicin, and nomorcapsaicin. Capsaicin and dihydrocapsaicin are the two primary compounds found in the capsaicinoids and are primarily responsible for the heat sensation a consumer gets when eating an untreated pepper. Because capsaicin and dihydrocapsaicin are primarily responsible for the heat in the peppers the present method is primarily concerned with removing the two compounds. The reason that the capsaicin and the dihydrocapsaicin are responsible for the heat is that they are present in the peppers in the greatest amounts and chemically generate the highest amount of heat, as compared to the other capsaicinoids. All the compounds comprising the capsaicinoids are, however, soluble in oil and are removed by the present method.

Any oil may be used as long as it is capable of solubilizing the capsaicinoids. For purposes of this application the term "extraction oil" will include any such oil, including but not limited to, edible oils, petroleum-based oils, mineral oils, and the like. Edible oils normally include oils in which the acyl groups are saturated fatty acids, unsaturated fatty acids, and combinations of saturated and unsaturated fatty acids. In addition, where the pepper will be included in a food product after extraction, it is important that the edible oil does not excessively deposit on or bind to the peppers, or damage the flavor, texture, or color of the peppers. As previously noted, both vegetable-based and animal-based oils may be used, but one edible oil that satisfies the criteria of removing the capsaicinoids without damaging the food qualities of the peppers is a vegetable oil, such as "Crisco." All the extraction oils preferably should be in a liquid state to achieve maximum solubilization of the capsaicinoids.

It is necessary to the present method to use some type of oil to remove the capsaicinoids. The capsaicinoids are soluble in oil, alcohol derivatives, and some other compounds, but not water. As mentioned above, edible oils are advantageous over other types of compounds, such as the alcohol derivatives or other oils, because they do not damage the natural qualities of the peppers. Further, edible oils are ideal for food use because they are not harmful to humans. Thus, an edible oil is preferred over other mediums that solubilize the capsaicinoids as it facilitates removal, does not damage the natural characteristics of the peppers, and is not harmful to humans. Additionally, edible oils are advantageous because of their ability to solubilize substantial amounts of the capsaicinoids.

A mineral oil may be used instead of an edible oil if the peppers are not to be used for human consumption. A mineral oil is desirable if the final use is to only extract the capsaicinoids and not use the peppers as a food product. Thus, mineral oil is preferred in non-food uses as it does not oxidize and it effectively extracts the capsaicinoids.

The placement time of the peppers in the edible oil is also important. The peppers are placed in the oil for a predetermined amount of time, in part, dependent upon the temperature of the oil. The higher the temperature of the oil the lesser the time required to remove the capsaicinoids, as shown in FIG. 2. Also, FIG. 2 shows that the higher the temperature of the oil the greater the initial removal. FIG. 2 shows the percentage loss of the capsaicinoids from the peppers on the vertical axis, with the time in the oil on the horizontal axis, and with the temperature of the oil indicated by "o" at 70° F., by "◊" at 150° F., by "∆" at 190° F., and "□" at 230° F. Generally, the placement time can be between about 30 seconds and about 30 minutes, however, the preferred time is between about 3 minutes and about 15 minutes. The time period is also dependent in part on the level of desired removal. To reduce the capsaicinoid amount in the peppers to negligible levels more time is required, whereas less time is required, if treated at the same temperature, to reduce the capsaicinoids to a predetermined level. Of course, if the capsaicinoid levels are to be reduced to a predetermined level, the amount of the capsaicinoids present in the peppers must be approximately known before treatment. Thus, the method can be used to reduce the capsaicinoids to specific or negligible levels. Further, by looking at FIG. 2 it can be seen that if the amount of the capsaicinoids is known before treatment, then the amount of removal can be predicted based on the temperature of the oil and the time of the peppers in the oil. Regardless of the time period, the peppers should be placed in the oil for a sufficient amount of time to allow suitable extraction without damaging the peppers or causing excess absorption of the oil onto the peppers. Also, the type of oil used may influence the time period, as some of the oils will more readily solubilize the capsaicinoids.

Additionally, the pepper oil mixture should be agitated to facilitate the removal of the capsaicinoids from the peppers. Agitation is important to prevent the oil from binding to a limited amount of the capsaicinoids. Through agitation more of the oil is exposed to the capsaicinoids causing more exposure between the compounds and thus greater removal. Agitation can include mixing, sonicating, shaking, tumbling, combinations thereof, or any other method capable of suitably circulating the oil among the peppers. Whatever the method of agitation, the oil should be in continuous movement. As a cautionary note, the peppers should not be agitated too rigorously as the cells of the peppers may be damaged. Preferably, a mixer is used at a mixing speed having a tip velocity of from about 30 feet/minute to about 270 feet/minute, with the most preferred mixing speed being a tip velocity of approximately 190 feet/minute.

Generally, the capsaicinoids are removed from the peppers in an amount greater than 80% of the total capsaicinoids in the peppers when the peppers are agitated at a tip velocity of approximately 190 feet/minute, in an edible oil having a temperature of approximately 180° F., for 3 to 5 minutes. These are the preferable conditions for adequate removal of the capsaicinoids, while maintaining the natural qualities of the peppers.

Once the peppers have been removed from the heated edible oil they are rinsed. Any method of rinsing may be used as long as the oil is adequately removed from the peppers. Thus, the peppers may be rinsed by air, water, or any other suitable method. Warm water is preferred as the cell structure of the peppers is not damaged, however, the water may be at any temperature as long as it effectively removes the excess oil and does not damage the peppers. Also, an air rinse may be used whereby the peppers are exposed to an air blast that adequately removes the oil. The peppers may be rinsed for any suitable amount of time so long as the oil is adequately removed from the surface of the peppers.

Once the edible oil is removed, the peppers may be used in a variety of food products. Furthermore, the edible oil or any other oil used may be processed to extract the capsaicinoids. Removal of the capsaicinoids from the oil may be accomplished in a number of ways including using a filter, a column, or any of a variety of known methods that will acceptably remove the capsaicinoids from the oil. A filter may be used as part of a continuous process whereby the oil saturated with the capsaicinoids, while still hot, can be passed through the filter to separate some of the capsaicinoids from the oil. The filter will generally have a mesh size between about 0.30 and about 0.60 microns with the preferable filter being a pharmaceutical grade filter having a size of about 0.45 microns. If the oil is not saturated the oil may be allowed to cool with the oil then being passed through the filter. By cooling the oil the saturation point of the oil will be lowered, thus facilitating the removal of the capsaicinoids from the oil. The oil may be cooled to a temperature ranging from slightly above the oil's freezing point to about 80° F., with the oil being sufficiently cooled to any desirably temperature to facilitate the extraction of the capsaicinoids. The preferable method, however, for removing the capsaicinoids from the oil, is to cool the oil and then pass the oil through a filter having about a 0.45 micron mesh. Regardless of the temperature about one third of the capsaicinoids can be separated from the saturated oil through filtration, with the remainder of the capsaicinoids remaining in the oil. As an alternative to using a filter, column chromatography, including an ion exchange column, may be used to remove a majority of the capsaicinoids. Column chromatography is potentially advantageous over filtration as chromatography has the ability to separate greater amounts of the capsaicinoids from the oil. Additionally, other methods may be used as long as the capsaicinoids are adequately removed from the oil. Upon removal from the oil, the capsaicinoids may be used in a variety of food products or other uses such as pharmaceuticals, coatings for wires, and other desirable uses.

Instead of removing the capsaicinoids from the oil, the oil containing the capsaicinoids may be used to flavor a variety of food products by cooking the food products in the oil. By cooking a food product in the oil containing the capsaicinoids, the heat from capsaicinoids is transferred to the food product, thereby increasing the heat level in the food product. Furthermore, this method can be used in combination with the removal of some of the capsaicinoids from the oil. After the oil has been filtered a significant amount of the capsaicinoids still remain in the oil allowing the oil to be used to flavor food products. Thus, both treated and untreated oil may be used to flavor food products.

In order to further illustrate the present invention the following examples are given. However, it is to be understood that the examples are for illustrative purposes only and are not to be construed as limiting the scope of the subject invention.

EXAMPLES

Example 1

Jalapeno peppers were diced into sections measuring approximately ⅛ of an inch by ⅛ of an inch. The diced peppers were then segregated into three different test runs. Run No. 1 included 50.23 grams of diced jalapenos which were placed into a 600 milliliter beaker with 400 milliliters of room temperature "Crisco" partially hydrogenated soybean oil. The beaker containing the pepper oil mixture was placed in a 150° F. water bath for 30 minutes after which the beaker was removed from the water bath and the oil was drained from the peppers. The peppers were then placed in a new beaker containing water having a temperature of 150° F. and the new beaker was placed into a 150° F. water bath for 30 minutes. Next, the peppers were removed from the water, rinsed with warm water, and air dried. At the conclusion of the procedure it was observed that the peppers had a darkened skin and the seeds had mined brown.

In the second run, the same procedures were followed as were used in the first run except the second run used 81.86 grams of jalapeno peppers, with the peppers being placed into a basket with holes. The basket holes were of a sufficient size to prevent the peppers from escaping the basket, while allowing the free passage of oil into and out of the basket. The basket was then placed into a beaker containing "Crisco" partially hydrogenated soybean oil having a temperature of 154° F. The beaker was shaken and occasionally the peppers were stirred. At the end of 20 minutes, the peppers were removed from the oil, rinsed with 1 liter of water having a temperature of 154° F., and allowed to dry. The peppers, it was observed, had a relatively normal color that was only slightly oily.

The third run again followed the same procedures as the first run except 75.30 grams of jalapeno peppers were placed in the basket used in run number 2. The basket containing the peppers was deposited into a beaker containing "Crisco" partially hydrogenated soybean oil having a temperature of 156° F. The beaker was then placed in the water bath for 20 minutes. During the time the peppers were immersed in the oil, the pepper oil mixture was sonicated. At the end of the 20 minute period, the final oil temperature had dropped to 109° F. After the peppers were removed from the oil, they were placed in a beaker containing 156° F. water and sonicated for an additional 20 minutes. At the end of the 20 minute period the final water temperature was 118° F. The peppers were then rinsed with 500 milliliters of 156° F. water. The peppers had a normal color and a slightly oily appearance.

Next, portions of the pepper samples from all three runs, as well as untreated peppers, were examined to determine the amount of the capsaicinoids and capsaicins in the peppers. To determine the amount of the capsaicinoids and capsaicins present in the peppers, both before and after treatment, the following method was used, with the results being compared to determine how much of the capsaicinoids and capsaicins were extracted. The peppers were accurately weighed and ground in a blender into a puree sample. The ground pepper sample was mixed with 100 ml of 95% ethanol and a sufficient amount of water to form a 200 ml suspension. The pepper suspension was then refluxed for 5 hours. After refluxing, the suspension was allowed to cool and then diluted to a total volume of 200 ml with 95% ethanol. The sample was then analyzed by injecting a 5 microliter sample into an HPLC column packed with reverse phase Nova-pak C-18, with the column having a flow rate of 1.1 ml/min and a mobile phase ratio of 46:54. Furthermore, the chromatographic test was isocratic. The HPLC column was monitored by a Coulochem II electrochemical detector. Data from the Coulochem II detector was collected, the data being given in peaks, and standardized by a computer to determine the amount of the capsaicinoids in parts per million (ppm) remaining in the peppers. The data was interpreted by measuring the area under the peaks. The following equation was used to determine the amount of the capsaicinoids:

((sample peak response/standard peak response)×(standard concentration (ppm)×(dilution/sample weight))=ppm of the capsaicinoids in the sample.

As mentioned above the Coulochem II detector gave a reading in peaks, with the peaks being used in the previous equation. The following table shows the samples, the weight of the samples tested, the sample dilutions, the capsaicins in the peppers, and the total amount of the capsaicinoids, including capsaicin and dihydrocapsaicin, in the peppers. The control was the measurement of the peppers before treatment with the present method. Also included in the table is the final amount of the capsaicins and the capsaicinoids present in the oil used in run 2, with the amounts of the capsaicinoids determined using the chromatographic test used to test the peppers.

| SAMPLE | SAMPLE WEIGHT | DILUTION | CAPSAICINS PPM | TOTAL CAPSAICINOIDS PPM |
| --- | --- | --- | --- | --- |
| Control | 23.1384 gm | 200 ml | 120 | 141.8 |
| 1st Run | 20.9236 gm | 200 ml | 62.5 | 88.6 |
| 2nd Run | 24.2121 gm | 200 ml | 21.2 | 32.4 |
| 3rd Run | 22.0322 gm | 200 ml | 39.7 | 57.4 |
| Oil | 10.1176 gm | 100 ml | 37.3 | 57.2 |

The data shows the capsaicinoids present in the control before treatment and the capsaicinoids present in the peppers after treatment. As can be seen from the data, run number 2 was the most successful in removing the capsaicinoids from the peppers. The data from run number 2 demonstrates that the most effective removal of capsaicinoids occurs when the oil is heated and the pepper oil mixture is agitated. Further, the results from run number 2 can be distinguished from the results of run number 3 based on the type of agitation. Also, note that the oil which initially contained no capsaicinoids, contained significant amounts of the capsaicinoids at the end of the experiments.

Example 2

In this example 4 and ⅓ pounds of jalapeno peppers were diced into quarter inch pieces. A water bath was prepared at a temperature of 169° F. The peppers were then placed in a beaker containing "Crisco" partially hydrogenated soybean oil that had a temperature of 169° F. and the beaker containing the pepper oil mixture was placed in the water bath. Two sets of tests were conducted using the same procedures, amounts, and time periods, with the time periods lasting 5, 10, 15, and 20 minutes. The peppers were agitated by gentle shaking and light stirring toward the end of each of the time periods. At the end of each of the time periods, the peppers were removed from the oil and rinsed with warm water.

The two tests were run to get a more accurate average of the peppers' loss of the capsaicinoids. The following table shows the amount of the peppers used for each test and the time periods of the respective tests.

| TEST A | TEST B | TIME/MIN. |
| --- | --- | --- |
| 100.1576 gm | 100.7123 gm | 5 |
| 100.2517 gm | 102.3270 gm | 10 |
| 100.5320 gm | 101.2223 gm | 15 |
| 100.5303 gm | 101.4963 gm | 20 |

After the peppers were removed from the oil, they were again tested according to the procedures used in Example 1 to determine the amount of the capsaicinoids in the peppers. The following table was derived using the same procedure used in Example 1, with the averages of the capsaicinoids additionally calculated using the equation:

(Test "A"+Test "B")/2=the average for the Total Capsaicinoids.

| SAMPLE | SAMPLE WEIGHT | DILUTION | CAPSAICINS PPM | TOTAL CAPSAICINOIDS PPM |
|---|---|---|---|---|
| Control A | 24.0381 gm | 400 ml | 72.0 | 105.5 Ave. 98.5 |
| Control B | 26.8852 gm | 400 ml | 61.7 | 90.5 |
| 5A | 24.9249 gm | 200 ml | 34.0 | 51.4 Ave. 54.7 |
| 5B | 27.6454 gm | 200 ml | 37.7 | 58.0 |
| 10 A | 28.8138 gm | 200 ml | 33.0 | 48.5 Ave. 51.8 |
| 10 B | 27.3497 gm | 200 ml | 36.3 | 55.1 |
| 15 A | 23.9492 gm | 200 ml | 26.5 | 40.6 Ave. 39.8 |
| 15 B | 24.2867 gm | 200 ml | 25.9 | 29.0 |
| 20 A | 27.6965 gm | 200 ml | 28.8 | 43.3 Ave. 44.9 |
| 20 B | 26.1311 gm | 200 ml | 31.4 | 46.5 |

The average percentage losses of the capsaicinoids were calculated by the following equation:

(Control average−Sample average)/Control average]×100=% loss of the capsaicinoids.

The average percentage loss of the capsaicinoids from the peppers was as follows:

| SAMPLE | PERCENT OF LOSS |
|---|---|
| 5 average | 44.4 |
| 10 average | 47.4 |
| 15 average | 59.6 |
| 20 average | 54.4 |

This experiment, once again, shows that the capsaicinoids are removed from the peppers by the heated oil. Here the most effective removal occurred when the peppers were exposed to the heated oil for 15 minutes. Theoretically the 20 minute exposure should have removed more of the capsaicinoids. The difference, however, in percentage loss between the 15 minute average and the 20 minute average can be attributed to a variety of factors including measuring error and/or experimental error, such as the oil was not as thoroughly removed from the peppers.

Example 3

In this test whole de-stemmed jalapeno peppers were placed in a Urschell dicer which cut the peppers into quarter inch pieces. Seven pounds of the diced peppers were then placed into a Groen five-gallon steam kettle containing four gallons of "Durex 100" partially hydrogenated soybean oil and the pepper oil mixture was stirred at a speed of 42 RPMs, with a tip velocity of 190 feet/minute. The temperature of the oil before the addition of the peppers was 197° F. The peppers had an initial temperature of 40° F., and after placement of the peppers in the oil, the oil temperature dropped to 131° F. After 2.5 minutes the temperature of the oil had risen to 165° F. and after 3 minutes the temperature of the oil was approximately 180° F. Once the oil temperature reached approximately 180° F. the time periods that the peppers remained in the heated oil were started. The time periods in the oil were 5, 10, and 15 minutes. When the 5 minute samples were removed from the oil, the temperature was at 176° F., at 10 minutes the temperature was 180° F., and at 15 minutes the oil temperature was 182° F. After removal, the samples were rinsed with warm water. The experiment was duplicated using another seven pounds of the diced jalapeno peppers. The second experiment used "Durex 100" partially hydrogenated soybean oil and, once again, the samples remained in the oil for time periods of 5, 10, and 15 minutes. The temperature of the oil was approximately 180° F.

In this example two sets of independent samples were used, with each sample having a pair of samples. For example, the first set was comprised of samples 5-1-A and 5-1-B, and the second set was comprised of 5-2-A and 5-2-B. Thus, for each time period four tests were conducted, with two samples being run simultaneously.

Again the final capsaicinoid amounts present in the peppers were tested according to the procedures used in Example 1. The results were as follows:

| SAMPLE | SAMPLE WEIGHT | DILUTION | CAPSAICINS PPM | TOTAL CAPSAICINOIDS PPM |
|---|---|---|---|---|
| Control 1A | 27.7650 gm | 200 ml | 66.7 | 108.3 Ave. 94.9 |
| Control 1B | 39.9132 gm | 200 ml | 50.1 | 81.4 |
| 5-1-A | 35.1491 gm | 200 ml | 9.2 | 15.9 Ave. 16.9 |
| 5-1-B | 32.1917 gm | 200 ml | 10.6 | 17.9 |
| 10-1-A | 31.3690 gm | 200 ml | 2.8 | 5.3 Ave. 6.2 |
| 10-1-B | 31.2896 gm | 200 ml | 3.6 | 7.0 |
| 15-1-A | 30.7849 gm | 200 ml | 2.9 | 5.5 Ave. 5.0 |
| 15-1-B | 34.9751 gm | 200 ml | 2.4 | 4.5 |
| 5-2-A | 37.7980 gm | 200 ml | 7.9 | 13.5 Ave. 14.7 |
| 5-2-B | 37.4951 gm | 200 ml | 9.3 | 15.8 |
| 10-2-A | 35.8617 gm | 200 ml | 5.6 | 9.9 Ave. 9.7 |
| 10-2-B | 35.0777 gm | 200 ml | 5.4 | 9.5 |
| 15-2-A | 35.6945 gm | 200 ml | 4.1 | 7.6 Ave. 7.5 |
| 15-2-B | 34.4951 gm | 200 ml | 4.1 | 7.3 |
| Control 2A | 35.1194 gm | 200 ml | 55.6 | 88.7 Ave. 89.9 |
| Control 2B | 36.5289 gm | 200 ml | 55.7 | 91.1 |

Here the results demonstrated a greater than 90 percent removal of the capsaicinoids from the peppers, which was determined using the same formula as was used in Example 2. Thus, the tests showed that the heated oil is an effective agent for extraction of the capsaicinoids from the peppers. Also importantly, these tests showed how increased agitation increases the capsaicinoids removal from the peppers, as the present example showed a removal of greater than 90% of the capsaicinoids when subjected to the oil for 15 minutes as compared to Example 2 where the peppers were lightly agitated and had 59.6% removal of the capsaicinoids when subjected to the oil for 15 minutes.

Example 4

This experiment was conducted to show the effects of time and temperature on the removal of the capsaicinoids. Additionally, this experiment was important in showing the effects on the natural characteristics of the peppers. In this experiment jalapeno peppers were allowed to warm to room temperature, as opposed to being placed into the oil in a chilled state. Seven pounds of the peppers were diced in a Urchell dicer into quarter inch pieces and the peppers were placed into four gallons of "Durex 100" partially hydrogenated soybean oil in a five-gallon Groen steam kettle. The soybean oil was at a temperature of 190° F. The pepper, oil combination was mixed at a speed of 42 RPMs, with a tip velocity of 190 feet/minute. The oil temperature dropped to 150° F. when the peppers were initially placed in the oil. The temperature of the oil had to be re-established to 180° F. before timing was initiated. The pepper samples were pulled from the oil at time intervals of 1, 3, 5, 7, and 9 minutes after timing was initiated. Once the samples were removed from the oil, they were spray-rinsed with warm water for 1 minute and then placed upon a towel to dry. The peppers were then placed in sealed bags and tested to determine a variety of different factors pertaining to food quality and appearance.

A Hunter Lab Colorimeter test was used to determine changes in the color of the treated peppers of this experiment. The peppers were tested according to their time in the oil. The test results designated by the letter "L" indicate lightness and darkness, with 0 being black and 100 being white. The results of the test designated by the letter "a" indicate color in a green to red spectrum, with green being a negative number and red being a positive number. Finally, test results designated by the letter "b" indicate the yellowness in a sample, with a negative number being blue and a positive number being yellow. The results of the tests were tabulated according to the time in the oil as follows:

| TIME   | L    | a    | b    |
|--------|------|------|------|
| 9 Min. | 34   | −5.1 | 15.3 |
| 7 Min. | 33.9 | −6   | 14.8 |
| 5 Min. | 35.2 | −7.3 | 14.4 |
| 3 Min. | 33.7 | −7.4 | 14.2 |
| 1 Min. | 33.6 | −8.3 | 13.2 |
| 0 Time | 32.7 | −8   | 14.8 |

The Hunter lab test demonstrated that as the treated peppers of this experiment were left in the oil they began to yellow and their green color diminished. Also, the L portion of the test indicated that the peppers began to lighten or turn white. The discrepancy in the L measurement is attributable to experimental error.

Also, the oil residue content in the treated peppers was measured using an acid hydrolysis test. The moisture content was determined by using a moisture by vacuum oven method having a temperature of 140° F., with the peppers being placed in the oven overnight (12 hours). These two tests were conducted as it is undesirable to add oil to peppers and it is desirable to maintain a constant moisture level.

| TIME    | % MOISTURE | % OIL |
|---------|------------|-------|
| Control | 91.1       | 0.13  |
| 3 Min.  | 92.3       | 0.35  |
| 5 Min.  | 92.8       | 0.36  |
| 9 Min.  | 91.6       | 0.71  |

As can be seen, with the passage of time the oil collected on the peppers and the moisture content slightly increased.

The pepper samples of this experiment were tested according to the procedures used in Example 1 to determine their capsaicinoid levels. The following table shows the results of the tests:

| SAMPLE    | SAMPLE WEIGHT | DILUTION | CAP-SAICINS PPM | TOTAL CAPSAICINOIDS PPM |
|-----------|---------------|----------|-----------------|-------------------------|
| Control 1 | 19.2198 gm    | 200 ml   | 61.5            | 97.9 Ave. 106.1         |
| Control 1 | 22.3592 gm    | 200 ml   | 70.5            | 114.2                   |
| 1A        | 21.5122 gm    | 200 ml   | 12.3            | 20.7 Ave. 26.0          |
| 1B        | 22.8731 gm    | 200 ml   | 18.2            | 31.4                    |
| 3A        | 24.7235 gm    | 200 ml   | 7.2             | 12.6 Ave. 12.5          |
| 3B        | 24.9072 gm    | 200 ml   | 7.2             | 12.4                    |
| 5A        | 24.9257 gm    | 200 ml   | 6.0             | 10.8 Ave. 13.8          |
| 5B        | 24.0254 gm    | 200 ml   | 9.6             | 16.8                    |
| 7A        | 25.0812 gm    | 200 ml   | 5.7             | 10.6 Ave. 10.2          |
| 7B        | 24.2929 gm    | 200 ml   | 5.3             | 9.8                     |
| 9A        | 31.6589 gm    | 200 ml   | 2.8             | 5.3 Ave. 6.3            |
| 9B        | 28.7273 gm    | 200 ml   | 3.9             | 17.3                    |

Here, an effective extraction of greater than 85% occurred from 3 minutes forward. Once again, the percent extraction was determined according to the calculation used in Example 2. Also, the Total Capsaicinoids Average was figured according to the equation used in Example 2. This example shows that the capsaicinoids were adequately removed, while maintaining desirable food qualities in the peppers.

Example 5

The same procedures were followed as in Examples 3 and 4, except that the jalapeno peppers were hand-quartered into longitudinal slices from the top of the pepper to the bottom of the pepper. Also, pepper samples were diced into quarter inch pieces so as to compare which method of cutting is more effective in removing the capsaicinoids. In this experiment, the samples were placed in heated "Durex 100" partially hydrogenated soybean oil and the timing for the placement in the oil began once the temperature of the oil was established at 180° F. The peppers were placed in the oil for periods of 3, 5, and 10 minutes. The peppers were stirred at a speed of 42 RPMs, with a tip velocity of 190 feet/minute.

The following table is a comparison between the quartered peppers and the diced peppers. Once again, the capsaicinoids were determined using the procedure of Example 1.

| SAMPLE TIME       | SAMPLE WEIGHT | DILUTION | CAP-SAICINS PPM | TOTAL CAPSAI-CINOIDS PPM |
|-------------------|---------------|----------|-----------------|--------------------------|
| 0 time quartered  | 23.5379 gm    | 200 ml   | 70.6            | 110.8                    |
| 0 time diced      | 24.9046 gm    | 200 ml   | 87.3            | 142.7                    |
| 3 Min. diced      | 25.9251 gm    | 200 ml   | 7.77            | 13.7                     |
| 5 Min. diced      | 32.5875 gm    | 200 ml   | 5.87            | 11.1                     |
| 5 Min. diced      | 31.4476 gm    | 200 ml   | 7.1             | 12.6                     |
| 10 Min quartered  | 29.0975 gm    | 200 ml   | 31.2            | 53.4                     |
| 5 Min. quartered  | 31.4262 gm    | 200 ml   | 26.2            | 42.6                     |
| 3 Min. quartered  | 29.5478 gm    | 200 ml   | 35.4            | 57.2                     |

This example shows that the most effective removal of the capsaicinoids occurred when the peppers were diced as opposed to being longitudinally sliced. As can be seen from the data a greater amount of the capsaicinoids were removed from the diced peppers. More importantly, what this means is that the capsaicinoids removal is facilitated by rupturing the placental membrane. It is difficult to rupture the placental membrane by making a longitudinal slice.

Example 6

The same procedures were followed as set forth in Example 4, except that instead of using seven pounds of peppers, 3½ pounds of peppers were used, also, 2 gallons of "Durex 100" partially hydrogenated soybean oil was used instead of 4 gallons. The temperature of the oil was continually adjusted to determine which oil temperature would allow for optimal removal of the capsaicinoids from the peppers. At each temperature the time periods for placement in the oil were 3, 5, and 10 minutes. The results were again determined according to the procedures used in Example 1 and were as follows:

| TEMP/TIME | SAMPLE WEIGHT | DILUTION | CAPSAICIN PPM | TOTAL CAPSAICINOIDS PPM |
|---|---|---|---|---|
| 0 time 2/14 #1 | 25.4248 gm | 200 ml | 42.2 | 67.7 Ave. 79.0 |
| 0 time 2/14 #2 | 27.9973 gm | 200 ml | 56.5 | 90.2 |
| 68° F. rm temp. 3 Min. A | 29.6093 gm | 200 ml | 29.7 | 46.5 Ave. 48.2 |
| 68° F. rm. temp. 3 Min. B | 24.4873 gm | 200 ml | 31.5 | 49.8 |
| Rm. temp. 5 Min. A | 30.4670 gm | 200 ml | 19.7 | 31.1 Ave. 33.2 |
| Rm. temp. 5 Min. B | 29.0057 gm | 200 ml | 21.1 | 35.2 |
| Rm. temp. 10 Min. A | 28.9787 gm | 200 ml | 25.9 | 41.9 Ave. 38.4 |
| Rm. temp. 10 Min. B | 31.4774 gm | 200 ml | 21.8 | 34.8 |
| 100° F. 3 Min. A | 29.9940 gm | 200 ml | 21.4 | 35.1 Ave. 31.5 |
| 100° F. 3 Min. B | 30.8649 gm | 200 ml | 17.4 | 27.9 |
| 100° F. 5 Min. A | 30.8158 gm | 200 ml | 23.9 | 37.8 Ave. 29.4 |
| 100° F. 5 Min. B | 30.7629 gm | 200 ml | 13.0 | 21.0 |
| 100° F. 10 Min. A | 30.4265 gm | 200 ml | 9.94 | 16.1 Ave. 31.0 |
| 100° F. 10 Min. B | 29.1094 gm | 200 ml | 27.6 | 45.8 |
| 120° F. 3 Min. A | 30.3457 gm | 200 ml | 16.4 | 26.2 Ave. 30.8 |
| 120° F. 3 Min. B | 29.8341 gm | 200 ml | 22.3 | 35.3 |
| 120° F. 5 Min. A | 29.3692 gm | 200 ml | 21.02 | 34.8 Ave. 34.2 |
| 120° F. 5 Min. B | 31.1287 gm | 200 ml | 20.3 | 33.5 |
| 120° F. 10 Min. A | 33.0295 gm | 200 ml | 16.7 | 27.9 Ave. 28.7 |
| 120° F. 10 Min. B | 30.9481 gm | 200 ml | 17.0 | 29.5 |
| 150° F. 3 Min. A | 31.8264 gm | 200 ml | 19.4 | 32.4 Ave. 34.1 |
| 150° F. 3 Min. B | 28.9262 gm | 200 ml | 22.1 | 35.8 |
| 150° F. 5 Min. A | 31.1999 gm | 200 ml | 12.0 | 20.3 Ave. 23.8 |
| 150° F. 5 Min. B | 29.8937 gm | 200 ml | 16.1 | 27.2 |
| 150° F. 10 Min. A | 33.8990 gm | 200 ml | 9.8 | 17.5 Ave. 21.4 |
| 150° F. 10 Min. B | 30.6634 gm | 200 ml | 14.3 | 25.3 |
| 170° F. 3 Min. A | 27.4982 gm | 200 ml | 18.7 | 31.3 Ave. 28.9 |
| 170° F. 3 Min. B | 28.5192 gm | 200 ml | 16.2 | 26.4 |
| 170° F. 5 Min. A | 32.7595 gm | 200 ml | 11.3 | 19.6 Ave. 25.9 |
| 170° F. 5 Min. B | 29.8845 gm | 200 ml | 18.4 | 32.1 |
| 170° F. 10 Min. A | 26.1852 gm | 200 ml | 10.3 | 18.6 Ave. 16.5 |
| 170° F. 10 Min. B | 27.6536 gm | 200 ml | 7.7 | 25.5 |
| 190° F. 3 Min. A | 31.2823 gm | 200 ml | 10.4 | 18.3 Ave. 21.9 |
| 190° F. 3 Min. B | 30.9534 gm | 200 ml | 14.8 | 25.5 |
| 190° F. 5 Min. A | 30.7158 gm | 200 ml | 8.1 | 14.8 Ave. 15.9 |
| 190° F. 5 Min. B | 32.8818 gm | 200 ml | 9.6 | 17.0 |
| 190° F. 10 Min. A | 29.6500 gm | 200 ml | 7.5 | 13.3 Ave. 11.7 |
| 190° F. 10 Min. B | 30.8192 gm | 200 ml | 5.3 | 10.0 |
| 210° F. 3 Min. A | 30.1441 gm | 200 ml | 8.9 | 15.9 Ave. 17.9 |
| 210° F. 3 Min. B | 30.6718 gm | 200 ml | 11.1 | 19.9 |
| 210° F. 5 Min. A | 31.2543 gm | 200 ml | 6.3 | 11.2 Ave. 11.1 |
| 210° F. 5 Min. B | 33.2840 gm | 200 ml | 6.0 | 11.0 |
| 210° F. 10 Min. A | 30.0319 gm | 200 ml | 5.1 | 9.9 Ave. 8.9 |
| 210° F. 10 Min. B | 34.3471 gm | 200 ml | 4.1 | 7.9 |
| 230° F. 3 Min. A | 30.3250 gm | 200 ml | 7.6 | 13.7 Ave. 112.7 |
| 230° F. 3 Min. B | 28.5318 gm | 200 ml | 6.6 | 11.7 |
| 230° F. 5 Min. A | 31.2511 gm | 200 ml | 7.4 | 14.1 Ave. 12.2 |
| 230° F. 5 Min. B | 35.5167 gm | 200 ml | 5.5 | 10.2 |
| 230° F. 10 Min. A | 32.3663 gm | 200 ml | 3.2 | 6.5 Ave. 7.4 |
| 230° F. 10 Min. B | 28.8530 gm | 200 ml | 4.3 | 8.2 |

The next table shows the average percentage loss of the capsaicinoids from the samples with the percentage loss being calculated according to the formula used in Example 2. The following table was also used to plot the graph in FIG. 2.

| TEMPERATURE | 3 MIN. | 5 MIN. | 10 MIN. |
|---|---|---|---|
| 230° F. | 83.92 | 84.56 | 90.63 |
| 210° F. | 77.34 | 85.95 | 88.73 |
| 190° F. | 72.28 | 79.87 | 85.19 |
| 170° F. | 63.42 | 67.22 | 79.11 |
| 150° F. | 56.84 | 69.87 | 72.91 |
| 120° F. | 61.01 | 56.71 | 63.67 |
| 100° F. | 60.13 | 62.78 | 60.76 |
| 70° F. | 38.99 | 58.01 | 51.39 |

As can be seen, the longer the exposure and the hotter the oil, the greater the extent of the removal of the capsaicinoids from the peppers. Note, however, if left in the oil too long, the oil will damage the natural qualities of the peppers. Once again, discrepancies can be attributed to measuring and experimental errors.

Example 7

In this experiment a soybean oil was tested to determine how much of the capsaicinoids the "Crisco" partially hydrogenated soybean oil could solubilize. The capsaicinoids used were a commercial capsaicin having the formula 8-methyl-N-vanillyl-6-nonanamide. To 4 gm of the oil, the capsaicin was added in amounts ranging between approximately 1 milligram and 12 milligrams. The oil was heated to 180° F. in a multi-block heater with the additions added to the oil as follows:

| SOYBEAN OIL | | | |
|---|---|---|---|
| 4.0080 gm CAPSAICINS | | | |
| 1st addition | 10.7 mg. | 10th addition | 4.2 mg. |
| 2nd addition | 2.5 mg. | 11th addition | 4.1 mg. |
| 3rd addition | 1.5 mg. | 12th addition | 8.9 mg. |
| 4th addition | 0.9 mg. | 13th addition | 8.1 mg. |
| 5th addition | 1.2 mg. | 14th addition | 11.2 mg. |
| 6th addition | 2.4 mg. | 15th addition | 10.0 mg. |
| 7th addition | 3.0 mg. | 16th addition | 6.1 mg. |
| 8th addition | 3.6 mg. | 17th addition | 7.7 mg. |
| 9th addition | 2.5 mg. | | |

The heated saturated oil was then filtered through a 0.45 micron filter into a Supelco 5 ml. reaction vial. From the vial containing the heated saturated oil 10 microliters of the oil was removed. The saturated oil was then allowed to cool to 70° F. and was filtered through a 0.45 micron Whatman filter paper into a second vial. A 10 microliter sample was taken from the second vial. The samples taken from the vials were tested according to the procedure of Example 1 to determine the amount of capsaicin present in the oil. The results were as follows:

Capsaicin levels solubility study

| OIL TEMP. | DILUTION | TOTAL CAPSAICIN |
|---|---|---|
| 180° F. | 10.0 microliter dil to 10 ml | 19411.5 ppm |
| 70° F. | 10.0 microliter dil to 10 ml | 15751.5 ppm |

As can be seen, the heated oil was capable of solubilizing a greater amount of the capsaicinoids then the cooled oil, which is important as this allows a greater amount of the capsaicinoids to be recovered when the heated oil is cooled and filtered.

Thus there has been shown and described a novel method for removing capsaicinoids from peppers which fulfills all of the objects and advantages sought therefor. It will be apparent to those skilled in the art, however, that many changes, variations, modifications, and other uses and applications for the subject method are possible, and also such changes, variations, modifications, and other uses and applications which do not depart from the spirit and scope of the invention are deemed to be covered by the invention which is limited only by the claims which follow.

What is claimed:

1. A method for removing capsaicinoids from a pepper having a placental membrane which comprises the steps of:
   cutting the pepper to expose the pepper's placental membrane;
   exposing the placental membrane of the cut pepper to an edible oil, at a temperature ranging from between about 50° F. and about 250° F. for a period of time ranging from about 30 seconds to 15 minutes, sufficient to allow the edible oil to remove at least some of the capsaicinoids from the placental membrane of the cut pepper; and
   removing the cut pepper from the edible oil, wherein the cut pepper's moisture content, color, and cell structure remain substantially unchanged after exposure of the placental membrane to the edible oil.

2. The method of claim 1 wherein the edible oil comprises an acyl selected from the group consisting of saturated fatty acids, unsaturated fatty acids, and a combination of saturated fatty acids and unsaturated fatty acids.

3. The method of claim 1 wherein the temperature is from about 120° F. to about 200° F.

4. The method of claim 3 wherein the preferred temperature is about 180° F.

5. The method of claim 1 wherein the preferred time is from about 3 to about 5 minutes.

6. The method of claim 1 wherein the pepper is cut into sizes ranging from minced to longitudinal slices.

7. The method of claim 1 wherein the pepper in the edible oil is agitated.

8. The method of claim 7 wherein the agitation may be accomplished by shaking, tumbling, mixing, or a combination thereof.

9. The method of claim 1 wherein the pepper may be rinsed after treatment in the oil by either a water rinse, an air rinse, or a combination thereof.

10. The method of claim 8 wherein the pepper in the heated edible oil is agitated by a mixer having a tip velocity of between about 30 feet/minute and about 270 feet/minute.

11. The method of claim 10 wherein the mixing speed tip velocity is approximately 190 feet/minute.

12. A method for removing capsaicinoids from a pepper, wherein the pepper's natural characteristics of color, texture, and flavor remain substantially the same as before treatment with the method, comprising the steps of:
   (a) cutting the pepper so as to expose the interior of the pepper;
   (b) placing the cut pepper into a desired amount of edible oil having a temperature ranging between about 120° F. and about 200° F. to facilitate a transfer of the capsaicinoids from the pepper to the edible oil;
   (c) agitating the pepper in the edible oil;
   (d) removing the pepper from the edible oil after a period of time ranging between about 30 seconds and 15 minutes; and
   (e) rinsing the pepper so that the method provides a treated pepper that has a color, texture, and flavor substantially similar to an untreated pepper.

13. The method of claim 12 wherein the pepper may be a single pepper or a plurality of peppers.

14. The method of claim 12 wherein the pepper may be selected from any group of peppers containing the capsaicinoids.

15. The method of claim 12 wherein the pepper may be selected from the group consisting of cayenne peppers, jalapeno peppers, yellow hot peppers, jalapeno peppers, green chili peppers, and habanero peppers.

16. The method of claim 12 wherein the capsaicinoids are selected from the group consisting of capsaicin, dihydrocapsaicin, nordihydrocapsaicin, homodihydrocapsaicin, norcapsaicin, and nornorcapsaicin.

17. The method of claim 12 wherein the capsaicinoids are selected from the group consisting of the capsaicin and the dihydrocapsaicin.

18. The method of claim 12 wherein the edible oil comprises an acyl selected from group consisting of saturated fatty acids, unsaturated fatty acids, and a combination of saturated fatty acids and unsaturated fatty acids.

19. The method of claim 18 wherein the edible oil is a vegetable oil.

20. The method of claim 12 wherein the preferred temperature is about 180° F.

21. The method of claim 12 wherein the preferred time period is from about 3 to about 5 minutes.

22. The method of claim 12 wherein the pepper is cut into sizes ranging from minced to longitudinal slices.

23. The method of claim 12 wherein the agitation may be accomplished by shaking, rambling, mixing, or a combination thereof.

24. The method of claim 12 wherein the pepper may be rinsed by either a water rinse, an air rinse, or a combination thereof.

25. The method of claim 23 wherein the pepper in the heated oil is agitated at a mixing speed tip velocity of between about 30 feet/minute and about 270 feet/minute.

26. The method of claim 25 preferred mixing speed tip velocity is approximately 190 feet/minute.

* * * * *

UNITED STATES PATENT AND TRADEMARK OFFICE
CERTIFICATE OF CORRECTION

PATENT NO. : 5,676,991
DATED : October 14, 1997
INVENTOR(S) : Bob J. Dull

It is certified that error appears in the above-identified patent and that said Letters Patent is hereby corrected as shown below:

Col. 4, line 4, "nomorcapaicin" should be -- nornorcapsaicin --.
Col. 6, line 65, "mined" should be -- turned -- .
Col. 11, line 25, "mm" should be -- turn -- .
Col. 15, line 16, "mi." should be -- ml. -- .
Col. 16, line 56, after the word "nordihydrocapsaicin" insert -- homocapsaicin -- .
Col. 17, line 8, "rambling" should be -- tumbling -- .
Col. 18, line 7, after the word "25" and before the word "preferred" insert -- wherein the -- .

Signed and Sealed this

Twenty-third Day of December, 1997

Attest:

Attesting Officer

BRUCE LEHMAN

Commissioner of Patents and Trademarks